(No Model.)
T. W. EVANS
CALF WEANER.
No. 320,056. Patented June 16, 1885.
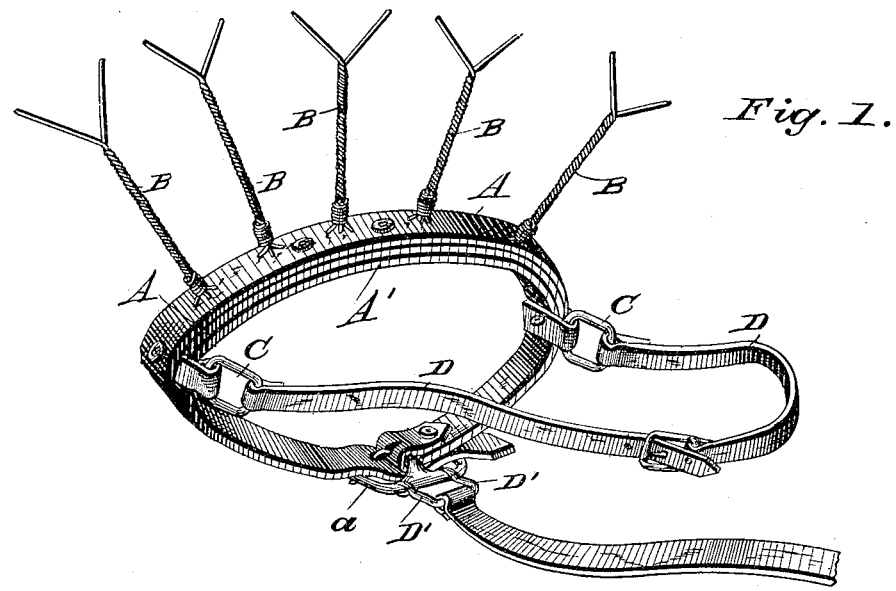
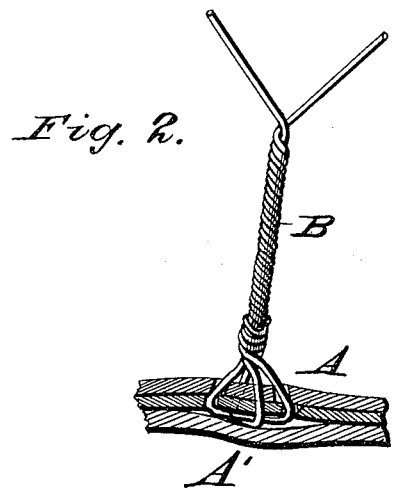
WITNESSES
Phil C. Dieterich
W. J. James
INVENTOR
Thos. W. Evans
By C. H. Watson & Co., Attorneys

United States Patent Office.

THOMAS W. EVANS, OF EVERGREEN, TEXAS.

CALF-WEANER.

SPECIFICATION forming part of Letters Patent No. 320,056, dated June 16, 1885.

Application filed February 12, 1885. (No model.)

*To all whom it may concern:*

Be it known that I, THOMAS W. EVANS, a citizen of the United States, residing at Evergreen, in the county of Hamilton and State of Texas, have invented certain new and useful Improvements in Devices for Weaning Suckling Animals, of which the following is a specification, reference being had therein to the accompanying drawings.

My invention relates to devices for weaning suckling calves and other animals, and the purpose thereof is to provide simple and efficient means for accomplishing such result which may be easily and quickly applied and which shall have the effect not only of preventing access to the udder, but to induce the mother to repel all attempts to suckle. I propose to accomplish these objects by a strap, ring, or belt surrounding the muzzle of the calf or other animal, and attached permanently by means of head-stall straps or other suitable devices, the muzzle-ring being provided with radiating blunt-pointed wires of suitable length, whereby the calf is prevented from reaching the teat, and the mother, being irritated or titillated by the projecting wires, repulses the attempts of the animal to suckle.

In the drawings accompanying the specification, Figure 1 is a perspective view, showing one form of my invention. Fig. 2 is a partial section of Fig. 1, illustrating the manner of applying the wires.

In the said drawings the reference-letter A indicates a strap, ring, or plate having flexible ends, which are united by a buckle, *a*, whereby the strap may be drawn up to fit an animal of any size.

Projecting upward from that portion of the strap which lies upon the nose are wires B, firmly mounted upon the strap and arranged in groups of two, three, or more, which may be twisted together throughout a part of their length, their ends being bent or spread outward, as shown, and slightly sharpened at the point, so that no injury will be done to the mother animal.

Underneath the strap A is placed a lining, A', by which the nose of the calf is protected from chafing upon the ends of the wires fastened in the strap.

Near each end of the strap or plate A, I place loops C, attached in any suitable manner, which receive the ends of a head-stall strap, D, whereby the device is secured to the animal. If desired, also a separate loop, D', may be provided to receive a strap by which the animal may be fastened or led.

The method of applying and using this device is too obvious to require description.

A wire may be extended from the chin-buckle to the throat-latch, to prevent the colt or calf from slipping the halter.

What I claim is—

The combination, with a strap having its ends united by a buckle, of wires attached to said strap in groups, each group being twisted and the ends of its several members bent outwardly, substantially as and for the purpose set forth.

In testimony whereof I affix my signature in presence of two witnesses.

THOMAS W. EVANS.

Witnesses:
 F. E. JONES,
 T. H. TEAL.